H. SHOEMAKER.
OSCILLIAMETER.
APPLICATION FILED DEC. 11, 1906.
932,819.
Patented Aug. 31, 1909.
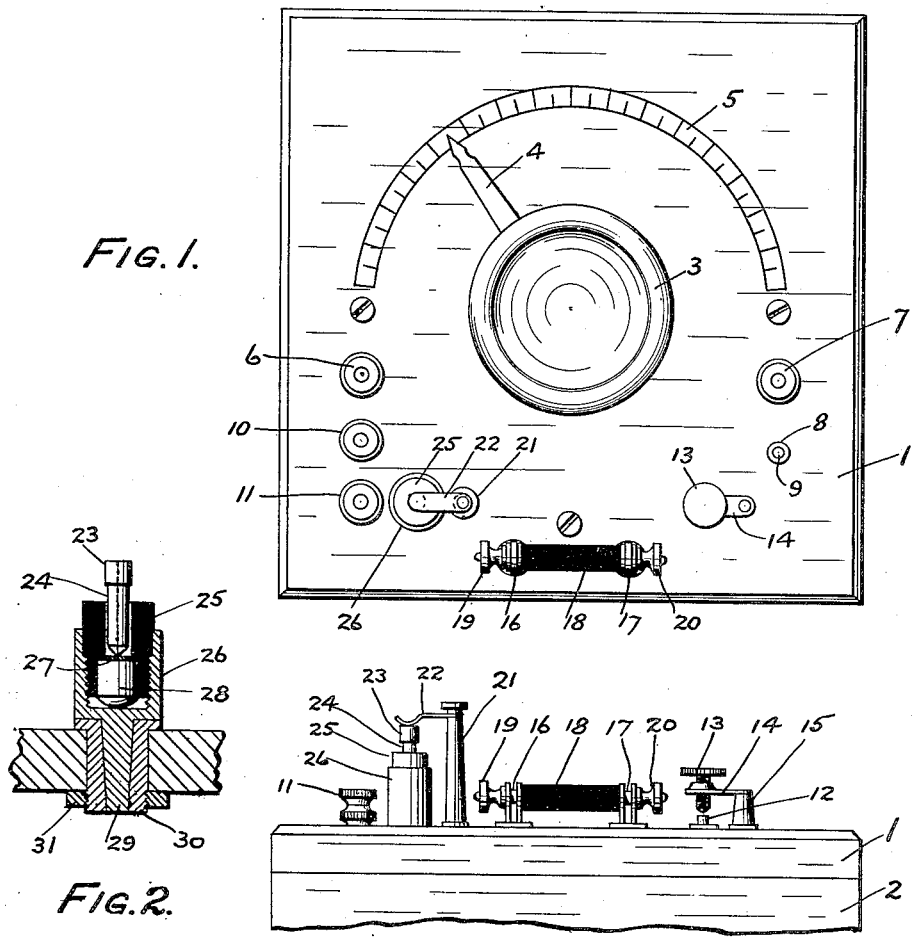
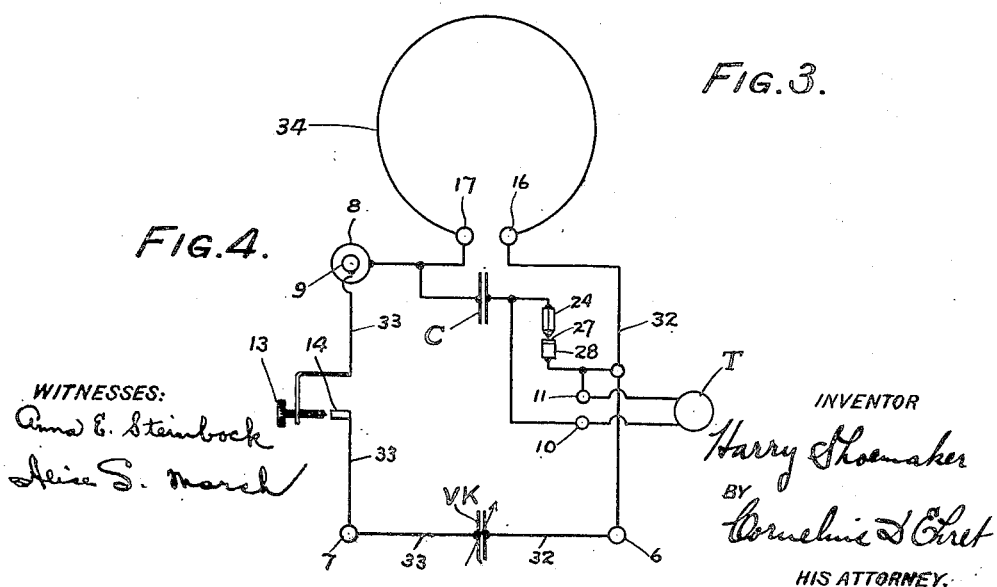
WITNESSES:
Anna E. Steinbock
Alice S. March
INVENTOR
Harry Shoemaker
BY
Cornelius D. Ehret
HIS ATTORNEY.

UNITED STATES PATENT OFFICE.

HARRY SHOEMAKER, OF JERSEY CITY, NEW JERSEY, ASSIGNOR TO INTERNATIONAL TELEGRAPH CONSTRUCTION COMPANY, A CORPORATION OF NEW YORK.

OSCILLIAMETER.

932,819.  Specification of Letters Patent.  Patented Aug. 31, 1909.

Application filed December 11, 1906. Serial No. 347,271.

*To all whom it may concern:*

Be it known that I, HARRY SHOEMAKER, a citizen of the United States, residing at Jersey City, in the county of Hudson and State of New Jersey, have invented a new and useful Oscilliameter, of which the following is a specification.

My invention relates to apparatus for making various determinations in the art of signaling by electroradiant energy, or in kindred arts.

It is the object of my invention to provide means for determining the frequency or the wave length of electroradiant energy, which means may serve to determine such factors of either a transmitting or receiving apparatus; and it is also the object of my invention that such means shall serve as a standard for producing at will electroradiant energy of a definite frequency or wave length. Such apparatus serves as well as a test instrument for adjusting transmitting apparatus, so it shall emit electroradiant energy of definite frequency or wave length; and similarly to adjust the receiving apparatus, so that it shall be in condition to respond selectively to received energy of definite frequency or wave length.

My invention resides also in a form of detector or wave-responsive device suitable for use in connection with such apparatus and particularly adaptable for mounting upon the instrument case.

My invention resides also in features hereinafter pointed out and described in the claims.

For an illustration of a form my invention may take, reference is to be had to the accompanying drawing, in which:

Figure 1 is a plan view of the instrument. Fig. 2 is a vertical sectional view, partly in elevation, of the detector or wave responsive device. Fig. 3 is a side elevation of the apparatus shown in Fig. 1. Fig. 4 is a diagrammatic view illustrating the circuit connections.

In the drawing, 1 is a top, of insulating material, of a box 2 containing a variable condenser, adjusted by means of the rotatable handle 3, and a condenser of constant capacity hereinafter referred to. A pointer 4, secured to the handle 3 or rotatable member of the variable condenser, passes over the scale 5, graduated in degrees, or if desired, in frequencies or wave lengths. The binding posts 6 and 7 form terminals of the variable condenser and serve for connection to external apparatus for certain purposes, as hereinafter described. A socket for a small incandescent lamp is also provided in the top 1, the screw threaded terminal is shown at 8 and the button terminal at 9. In certain instances a small incandescent lamp is screwed into this socket, and for other purposes a short circuiting plug is screwed into the socket, so that the terminals 8 and 9 are connected to each other without any intervening resistance. Binding posts 10 and 11 serve for connection of a telephone receiver or any other suitable indicating instrument. A spark gap is also provided and has as terminals the stationary platinum 12 and the adjustable platinum pointed screw 13 supported opposite the piece 12 by the arm 14, supported by the post 15. The adjustment of the screw 13 serves to adjust the length of the spark gap.

Clamps 16 and 17 serve to receive terminals of a conductor disposed in a coil or other suitable fashion to constitute an inductance element. A reinforcing piece of hard rubber 18 intervenes between the clamps, the clamp screws being represented at 19 and 20.

A post 21 carries at its top the metallic spring 22, which bears at its upper end upon the metallic cap 23 on the upper end of a glass tube 24. In the lower end of the glass tube is sealed a small conductor, as a carbon filament, or as a platinum, tantalum, copper or other suitable wire. Such conductor is electrically connected with the cap 23. The diameter of such filament or wire may be .001 of an inch, more or less, and may even be as large as .005 of an inch, or more. The glass and conductor are ground off, so that the end section only of the conductor is exposed. The glass tube enters a suitable opening in the rubber or other plug 25, screw threaded into the inside of the metallic cup 26. The plug 25 is recessed on its lower end and shouldered, a cloth, paper or other material, 27, impregnated with sulfuric or other acid, or with alkali, or with any suitable chemical material which will serve as a cell excitant, is confined in said recess upon the top of a block or rod 28 of zinc, iron, or other material, differently located in the galvanic scale from the conductor sealed in the glass tube 24. By screwing down the plug 25 the zinc or other rod 28 is held against the bottom of the cup 26, making electrical contact therewith.

The platinum or other conductor sealed in the tube 24 along with the amalgamated zinc or other rod 28, form the elements of a primary cell whose exciting material, acid, alkali, or salt, is supported in the cloth or paper sheet 27. The cell elements do not, therefore, contact with a free mass of liquid.

The cup 26 has a tapering stem 29, which is conveniently inserted into the tapered socket piece 30, of metal, fastened by the nut 31. Thus, the entire primary cell detector may be readily removed or inserted, and when inserted makes electrical contact with the post 21, and, on the other hand, with the socket 30 or nut 31.

Referring to Fig. 4, the reference characters indicate the same elements described in connection with Figs. 1 to 3 inclusive. VK represents the variable condenser adjusted by rotating the handle 3 and located within the box 2. One armature of this condenser is connected by conductor 32 with the clamp 16. The other armature is connected by conductor 33 with the other clamp 17, the spark gap 13, 14 and lamp socket 8, 9 intervening in series. To the clamps 16 and 17 is connected the inductance element 34 here shown as a single loop of conductor, but which may be a coil of conductor, or conductor disposed in any suitable form. A telephone or other suitable indicating instrument T is connected to the binding posts 10 and 11 which are in turn connected to the opposite elements of the primary cell detector 24, 27, 28. This detector or wave-responsive device is connected across the inductance element 34, a condenser C of suitable capacity intervening in series. Obviously the condenser C and the wave-responsive device are connected in shunt to the variable condenser VK as well, when the spark gap is closed up and the lamp socket 8, 9 short circuited by the plug heretofore mentioned.

With a given inductance element 34, and with the scale 5 divided into degrees, the apparatus may be calibrated by causing waves of known frequency or length to impinge upon the inductance 34 or other suitable conductor attached to the apparatus. For this calibration the spark gap 13, 14 is closed so that 13, 14 are in metallic contact, and the socket 8, 9 short circuited by inserting the short circuiting plug. Then by varying the condenser VK by rotating the handle 3 until a maximum response is heard or indicated in the telephone or other instrument T, a point on a calibration curve or table is found. And by repeating the process for other known wave lengths or frequencies, the curve or table for the entire range of the instrument may be determined. For securing the waves of known frequency or length, Hertz's method of producing waves on straight wires may be employed, or on such wire as can be measured directly in any suitable unit of length, as the foot or meter.

With a given inductance element 34, the instrument may be calibrated to read directly in frequencies or wave lengths on the scale 5. When the instrument has once been calibrated it may be put to various uses, several of which are as follows: To determine the frequency or length of electro-radiant energy waves: The waves to be measured are caused to impinge upon the conductor 34 or any other conductor suitably communicating with the instrument. Then with the spark gap closed and the lamp socket short circuited, the handle 3 is adjusted until a maximum response is had in the telephone T connected to the detector or wave-responsive device. With the intervening condenser C of suitable capacity the region of maximum response is very sharply defined and within very narrow limits, so that the wave-responsive device or detector and telephone may be used to great advantage when measuring very faint waves such as received at a receiving station from a distant transmitter. When the point of maximum response is determined the number of degrees on the scale 5 is read off as indicated by the pointer 4 and then by referring to the curve or table the frequency of the wave is read off. Or if the scale 5 is graduated directly in frequencies or wave lengths, the result is read directly from the scale 5 at the point indicated by the pointer 4. Thus, if the wave length of a distant transmitter is desired, the aerial conductor or receiving circuit may be connected to the posts 16 and 17 or 6 and 7 and then the adjustment of the condenser VK made as above described and the result read off. The extremely sensitive detector with the telephone makes the reading of the extremely weak waves possible, and as before stated, the circuit arrangements here shown are such as to give very sharply defined readings. Or when the transmitter is near at hand, the wave-responsive device and telephone may be omitted and with the spark gap 13, 14 closed, a small incandescent lamp is screwed into the socket 8, 9. Then the handle 3 is adjusted until the lamp comes to its greatest brilliancy. Then the reading is taken from the scale 5 as before. Or instead of using the incandescent lamp, it may be removed and the short circuiting plug inserted, and a Geissler or similar tube connected to the posts 16 and 17 or 6 and 7. When such tube glows at its maximum the reading on the scale 5 is taken.

To produce waves of definite frequency or length: For this purpose the instrument acts as a standard transmitter of low power, just as a "standard cell" serves as a standard of electromotive force. The spring 22 may be moved to one side and the tube 24 withdrawn, as may be also, if desired, the cup 26. With the telephone detached, the lamp socket 8, 9 short circuited, and the spark gap 13, 14 open, the instrument is in condition to produce waves of definite frequencies or lengths. The pointer 4 is moved to that part on the scale 5 corresponding with the frequency or wave length desired. Then the secondary of a small induction coil is connected to the posts 6 and 7 and the screw 13 adjusted until a suitable spark passes. Then a wave of the desired frequency or length is generated in the circuit VK, 13, 14, and 34, the conductor 34 and the connecting conductors serving as radiator. When so used to produce waves of definite length or frequencies, receiving apparatus may be adjusted to respond selectively to that particular frequency or wave length by bringing the wave producing instrument sufficiently close to the aerial conductor or receiving circuit, as, for example, to within a distance of a meter or two or three meters, or more or less.

In place of connecting and disposing the inductance element 34 upon the outside of the box 2, it may be contained within the box and may be suitably divided into a plurality of sections with a switching means for connecting in any or all of the said sections.

What I claim is:

1. In a combined wave meter and wave producer, the combination with a condenser, of an inductance, said condenser and inductance being common to said wave meter and to said wave producer, a spark gap, a wave-responsive device, means for associating either said spark gap or said wave-responsive device with said condenser and inductance, and a calibration scale for indicating the natural period of the combined condenser and inductance.

2. In an instrument of the character described, the combination with a variable condenser, of an inductance element, a scale for indicating the natural period of the combined condenser and inductance, and an incandescent lamp in series with said condenser and inductance as an indicating means.

3. In an instrument of the character described, the combination with a variable condenser, of an inductance element, a scale for indicating the natural period of the combined condenser and inductance, a spark gap and lamp serially connected with said condenser and inductance, and means for short circuiting either the spark gap or lamp.

4. In a wave meter, the combination with a variable condenser, of an inductance element, a scale for indicating the natural period of the combined condenser and inductance, a wave-responsive device in shunt with said condenser and inductance, and an indicating instrument associated with said wave-responsive device, whereby the frequency or wave length of feeble electroradiant energy may be determined.

5. In an electrical measuring instrument of the character described, the combination with a variable condenser, of an inductance element, a scale for indicating the natural period of said combined condenser and inductance, a condenser and a wave-responsive device serially connected across said variable condenser, and an indicating instrument associated with said wave-responsive device, whereby the wave-length or frequency of feeble electroradiant energy may be determined.

6. In an electrical measuring instrument of the character described, the combination with a variable condenser, of an inductance element, a scale for indicating the natural period of the combined condenser and inductance, a condenser and a detector serially connected across said inductance and condenser, and an indicating instrument associated with said detector, whereby the wave length or frequency of feeble electroradiant energy may be determined.

7. In a combined wave meter and wave producer, the combination with a condenser, of an inductance, said condenser and inductance serving both for the wave meter and for the wave producer, a spark gap, a detector, and means for bringing either the spark gap or the detector into operative relation with said condenser and inductance.

8. In an instrument of the character described, the combination with a condenser, of an inductance, means for adjusting the natural period of the combined condenser and inductance, a scale for indicating the natural period, a spark gap and a lamp associated with said condenser and inductance, and means for short circuiting either said spark gap or lamp.

9. In a wave meter, the combination with a condenser, of an inductance, a scale for indicating the natural period of the combined condenser and inductance, and a sensitive detector connected in derivation with said condenser and inductance.

10. In a wave meter, the combination with a condenser, of an inductance, a scale for indicating the natural period of the condenser and inductance, and a sensitive detector consuming relatively small energy connected in derivation with said condenser and inductance.

11. A wave meter comprising a condenser and inductance, a scale for indicating the natural period of the combined condenser and inductance, and a sensitive detector requiring no local battery and consuming relatively small energy connected in derivation with said condenser and inductance.

12. A wave meter comprising a condenser and inductance, means for varying the natural period, and a scale coöperating with said means for indicating the natural period of the combined condenser and inductance, a wave-responsive device consisting of means for producing current under the influence of high frequency oscillations, and a condenser intervening between said wave-responsive device and said condenser and inductance.

13. A wave meter comprising a condenser and inductance, a casing, a cover therefor, a wave-responsive device associated with said condenser and inductance, and a plug receptacle supporting said wave-responsive device and engaging in a socket member in said cover.

14. A portable wave meter comprising combined condenser and inductance, means for varying the natural period, and a scale for indicating the natural period resulting from adjustment, and a sensitive detector consuming relatively small energy and requiring no local battery connected in derivation with said condenser and inductance.

In testimony whereof I have hereunto affixed my signature in the presence of two subscribing witnesses.

HARRY SHOEMAKER.

Witnesses:
  JAMES M. SAWYER,
  A. D. KNEUPER.